United States Patent [19]

Haynes

[11] Patent Number: 4,979,917
[45] Date of Patent: Dec. 25, 1990

[54] MARINE PROPULSION DEVICE WITH GASEOUS BOUNDRY LAYER FOR A THRUST JET FLOW STREAM EXHIBITING STEALTH AND ICE LUBRICATION PROPERTIES

[76] Inventor: Hendrick W. Haynes, P.O. Box 66152, 250 SW. 176th St., Seattle, Wash. 98166

[21] Appl. No.: 925,544

[22] Filed: Oct. 31, 1986

[51] Int. Cl.$^5$ .............................................. B63H 11/04
[52] U.S. Cl. ...................................... 440/38; 440/44; 440/47
[58] Field of Search ................ 440/38, 44, 47, 66–68; 114/67 A, 151

[56] References Cited

U.S. PATENT DOCUMENTS

| 207,018 | 8/1878 | Cowles | 440/38 |
| 1,662,206 | 3/1928 | Paxton | 440/38 |
| 3,273,333 | 9/1966 | Roulund | 440/44 |
| 3,643,438 | 2/1972 | Barsby | 440/45 |
| 4,552,537 | 11/1985 | Haynes | 440/47 |
| 4,611,999 | 9/1986 | Haynes | 440/47 |

FOREIGN PATENT DOCUMENTS 748218 10/1944 Fed. Rep. of Germany ........ 440/67

Primary Examiner—David H. Brown

[57] ABSTRACT

An engine or motor is attached in a driving relationship to a water moving device, such as a pump, and a thrust outputing portion, such as a nozzle. Heat generated by and rejected by the engine or motor is passed into the pump base for dissipation into the outputtted jet stream. A supply of gas, such as air, and/or exhausted gases from the motive source is ejected around the outputted water stream in a critically defined boundary layer to reduce (1) against-the-hull turbulence induced by the ejected water flow, (2) water jet stream or thrust energy losses (3) vessel afterbody wake losses, (4) propulsion system underwater noise created by the ejected water stream (acoustical isolation), and (5) the contact friction of water born debree against the vessel hull.

12 Claims, 14 Drawing Sheets

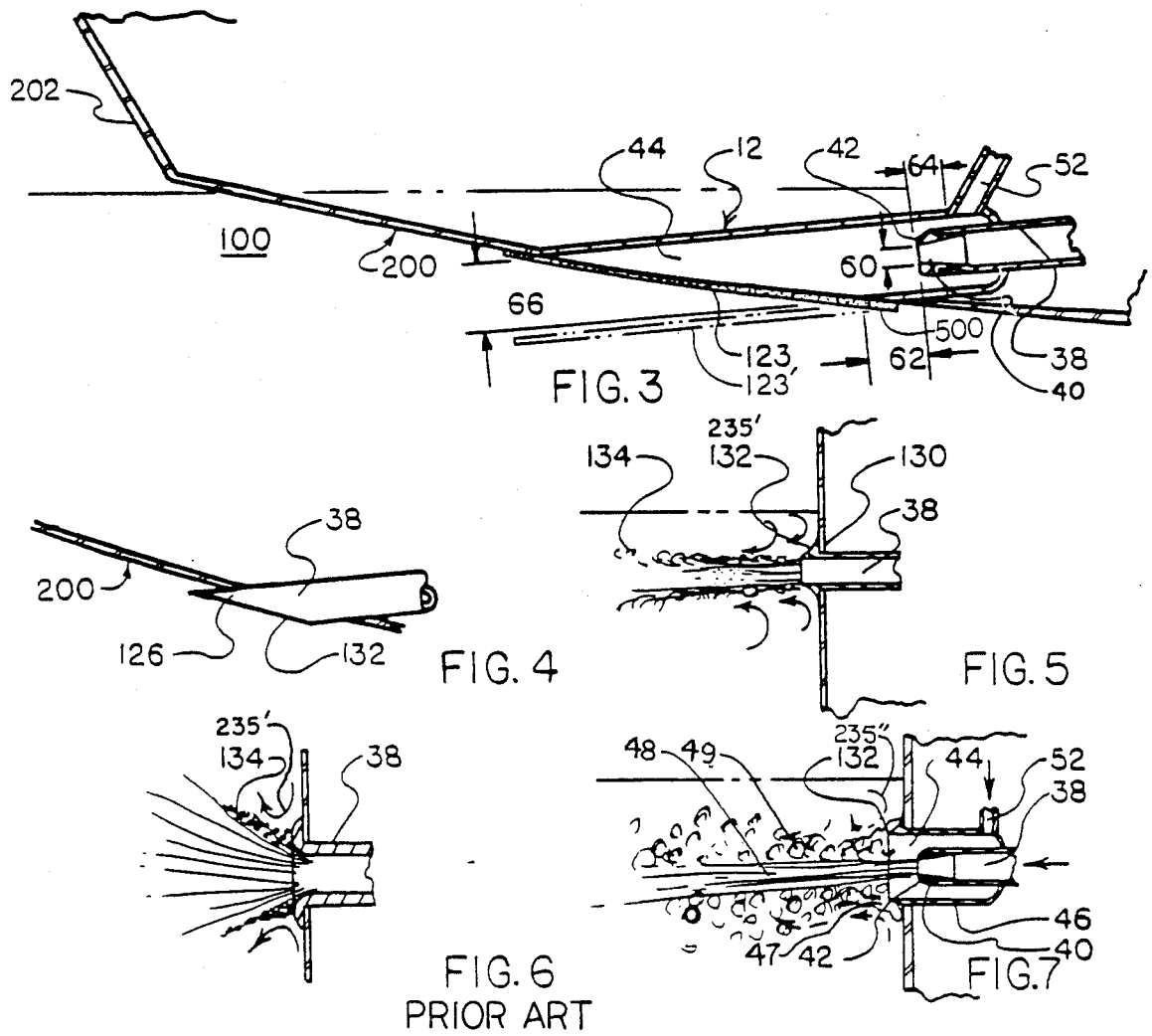

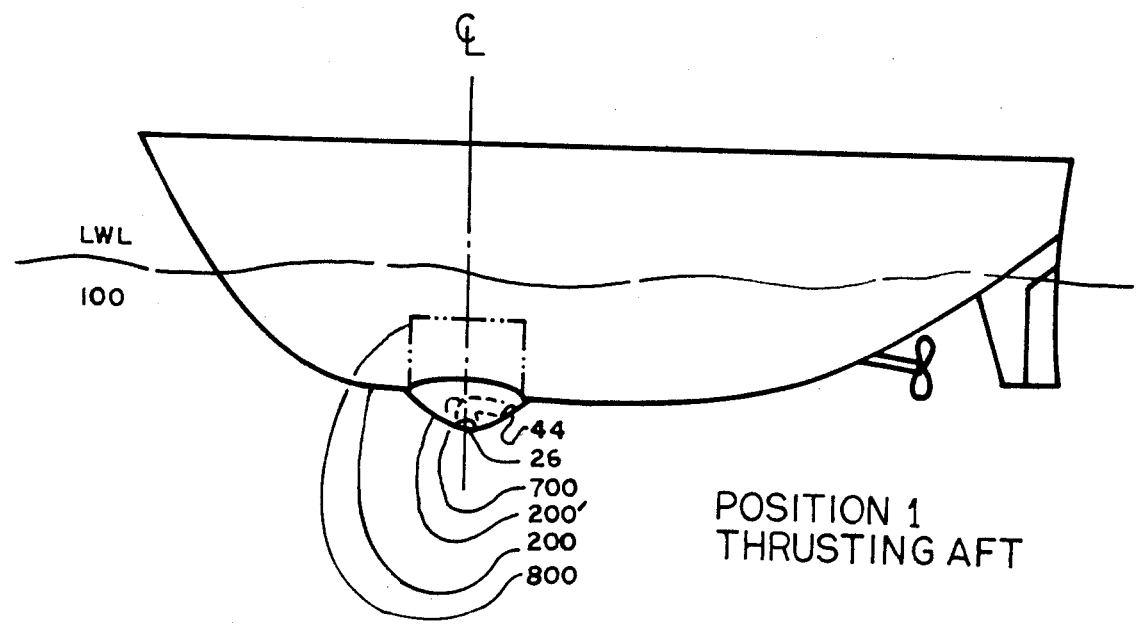
POSITION 1
THRUSTING AFT
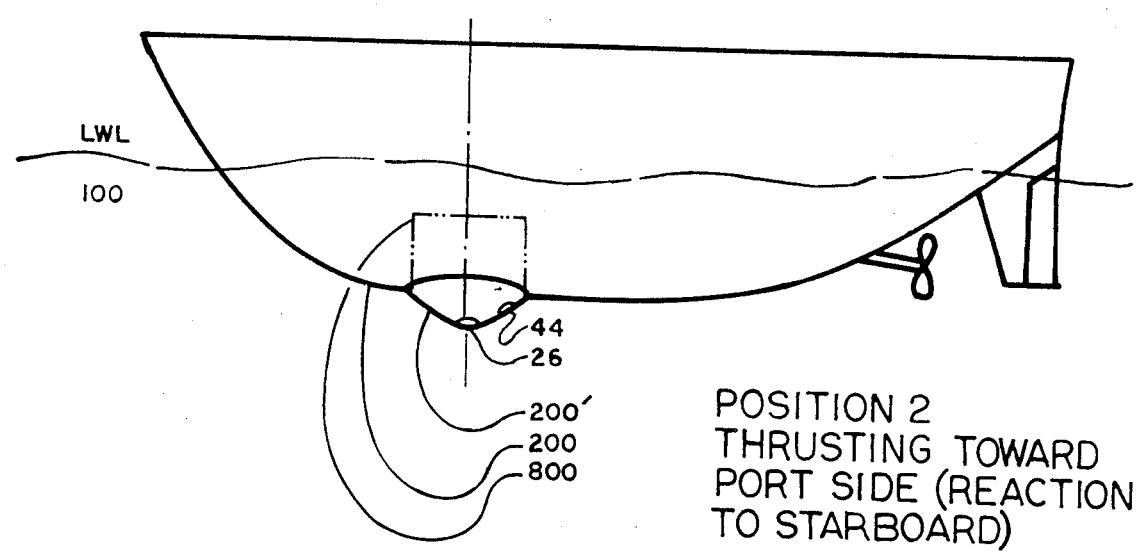
POSITION 2
THRUSTING TOWARD
PORT SIDE (REACTION
TO STARBOARD)
FIG. 18

MARINE PROPULSION DEVICE WITH GASEOUS BOUNDRY LAYER FOR A THRUST JET FLOW STREAM EXHIBITING STEALTH AND ICE LUBRICATION PROPERTIES

BACKGROUND OF THE INVENTION

The subject invention deals with submerged marine propulsion devices, such as propeller drives and submerged discharging jet drives. In particular, it relates to an "anti-Coanda" effect drive with a very low underwater noise signature. The subject invention, besides producing a high net thrust, also has the potential of lowering vessel required thrust to make a specific speed, both through "clean" water and through debris laddened waters, such as in ice laddened seas. It also provides a means wherein the propulsive force necessary to make speed may be quietly transfered into the water, thereby offering the vessel a greater stealth capability than may be available through comparable propulsive means. In military applications, this could be a mine sweeper operating about accoustically sensitive mines . . . a submarine countermeasures vessel operating with low propulsion system noise while attacking a target . . . a submarine operating in a "silent" mode . . . and types of torpedoes. It may also be advantageous to fishing vessels and research vessels, both for the gathering and studying of aquatic life.

Inboard auxiliary or main drive engines which use directed water for propulsive power, such as propellers and marine jets, develop thrust by the transfer of momentum, e.g., the ejection of water away from the boat system. With propeller drives and submarine discharging jets located submerged near the hull, the ejected water drags other water with it and influences the water flow about the hull. This "dragging" of water into a changed path about the hull takes applied thrust away from that available for driving the hull forward or driving objects away. A negative pressure zone of influence is created against the hull, and this in measure cancels a portion of the thrust capability of the propulsor.

The propensity for a moving fluid to follow a curved surface it is flowing against is known as the "Coanda Effect". Thrust lost through a propeller or water pumping device as compared with its test tank "model" test is composed of changes (powered vs. unpowered vessel) in (a) flow fields of the water pumping device due to installation in the vessel, (b) modification of the vessels frictional and eddy drag characteristics due to the water pumping devices changes in the vessels boundry layer flow path at speed, (c) modification of the vessels wave making, and (d) Coanda effect losses. The total cf these losses is called the "thrust deduction factor", or TDF. Simply stated, the thrust fraction (t) lost is the difference between the thrust required to free tow an unpowered vessel at speed as apposed to the shaft thrust required to push the vessel with the propulsor installed. The thrust fraction lost can range from a loss of a few percent to over 50 percent depending on the propulsor and the installation. TDF can be measured by subtracting the VESSEL ENGINED MEASURED THRUST (VEMT) from the IDEAL FREE UNPOWERED VESSEL TOW THRUST (IFUT) or vessel system model tow thrust, and dividing this by the IFUT. This fraction, representing thrust CONSERVED, must be subtracted from 1 and multiplied by 100 to yield percent loss, e.g.:

$$T \text{ percent loss} = \{1 - [(IFUT - VEMT)/IFST]\} \times 100$$

The remaining thrust, or actual propulsive thrust, acts to drive the hull into equalibrium with hull resistance as the vessel accelerates to speed. The above assumes a high order of correlation between "model tests" and historical sea trials data. Ideally, IFUT is from a full scale model test.

The total thrust required to drive a vessel at speed, e.g., Thrust Horsepower (THP) is equal to the shaft thrust required to overcome the unpowered Ships resistance at speed (Sr). The NET horsepower driving the vessel is the EFFECTIVE horsepower, or EHP. More accurately defined, $$THP = \{T \times [Vk(1-w)]\}/325.6$$

$$EHP = [T \times Vk \times (1-t)]/325.6$$

$$Hp. \text{ lost} = THP - EHP = (THP) \times t$$

$$t = [THP - EHP]/THP$$

Where:
T = Propulsor thrust in lbs.
Vk = Speed of ship through water in knots
Va = Propeller speed of advance in knots
t = Thrust Fraction
(1−t) = Thrust Deduction Factor
w = wake fraction
where
(Taylor) $w = (Vk - Va)/Vk = 1 - (Va/Vk)$ The resistance due to the ships underwater profile is composed of Frictional Resistance, Eddy Current Resistance, and Wave Making resistance. The subject invention operates to reduce thrust deduction factor (TDF). The subject invention operates, to a smaller degree, to reduce the vessels "free towed" driving thrust requirements by reducing the vessels stern wave making and stern hull resistance (due to local frictional and eddy current) properties. The subject drive not only reduces the influence of propulsion system water flow effects on the hull form, but also can change the "effective" hull shape under the influence of a fluid flow about a curved body.

The invention herein described is related primarily to submerged discharging water pumping systems used for powering marine vessels, such as a submerged discharging marine jet pumps, nozzled propeller drives or tube (tunnel) mounted propeller drives. The subject invention provides a means wherein heat from the motor or engine can be used to provide gases for surrounding the ejected submerged discharging jet stream for providing increased net propulsive thrust. Also, the motor or engine waste or exhausted gases can be vented around the outside of the ejected jet stream. Alternately, ambient air may be supplied to produce the gaseous boundry layer surrounding the jet stream and against the submerged surfaces of the vessel hull. Alternately, the gas supply to the subject invention may be supplied by a separate chemical gas generator means or compressed gas supply. The gases provided surrounds the submerged water jet or water stream and flows up against the vessel hull and/or flows with the jet or water stream away from the hull. This develops a barrier layer which expands and provides a low average kinematic viscocity shearing layer, thus working to reduce the gross propulsion system effort in thrusting the vessel forward (as to be hereinafter further explained), and in accoustically isolating the thrusting system (isolating propulsion system and jet discharge noise). Further, this gaseous boundry layer or shearing layer, besides increasing net propulsive thrust and through the modification of the vessels resistance properties, increases boat speed, it also significantly reduces propulsive force noise transmission into the water. This would make the drive useful in applications requiring great stealth, such as in types of submarine warfare, in vessels engaged in mine sweeping, and in types of fishing operations.

To reduce parasitic hull drag and deterioration of jet efficiency by marine life growing inside the jet pump, and for closing of the jet openings to lower hull resistance when the jet system is not in use (when the jet is a power augmentation or auxiliary power source), streamlining and sealing hull closures are incorporated. The jet system may be used in an auxiliary or thrust augmentation source on vessels which sail, on military and maritime vessels which have as their main power system a fixed blade or controllable pitch propeller system, and as a prime mover in its own right. The aforementioned system may be used as a propulsion system, as well as a bow thrusting system.

OBJECTS AND ADVANTAGES

It is an object of this invention to provide a means of propulsion utilizing a housed propeller, tube mounted propeller or submerged discharging marine water jet, which produces a higher net propulsive force than conventional designs unaided by the subject invention.

It is an object of this invention to provide a means of propulsion utilizing a method of power application wherein the resistance of a vessels movement through the water may be lowered, thus allowing propulsion systems of lower net thrust to drive the vessel at speed.

It is an object of this invention to provide a means of propulsion utilizing a propeller, housed propeller, tube mounted propeller or submerged discharging marine water jet, for powering a marine craft with a lower under water noise signature than is available with conventional designs unaided by the subject invention.

It is an object of this invention to provide a means whereby engine waste heat may be recovered and converted into gases useful in surrounding the discharged water jet stream which propels the vessel, and thereby increasing net system energy conversion into propulsive thrust, and vessel speed, and also reduce the propulsion noise signature.

It is an object of this invention to provide a means whereby a gaseous boundry layer is provided around the ejected water flow stream of a propeller, a housed propeller, a tube mounted propeller or submerged discharging water jet, for powering a marine craft, wherein this gaseous boundry layer provides a region of shear that isolates the water output jet flow and reduces the jet flows propensity to drag objects, such as ice debree, along with it.

It is an object of this invention to provide a means whereby a gaseous boundry layer is provided around the ejected water flow stream by an isolated gas source means, such as compressed gas in a bottle or a chemical reaction chamber resident on the vessel.

It is an object of this invention to provide a means whereby a gaseous boundry layer is provided around the ejected water flow stream of a propeller, a housed propeller, a tube mounted propeller or submerged discharging water jet, for powering a marine craft, wherein this gaseous boundry layer extends along and against the vessel hull and along the outputted jet stream, and produces a region of shear and low kinematic viscocity, wherein the rising current adjacent to the hull of this gaseous boundry layer against-the-hull and around the jet flow from the vessels propelling means tends to isolate the vessel hull from contact with foreign suspended and floating objects, such as ice debree, thus reducing the drag the vessel may experience in moving through a field of such objects (thus providing a kind of lubrication through a field of broken ice, e.g., an ice lubrication).

It is an object of this invention to provide a means whereby a gaseous boundry layer propulsion means above described may be incorporated in a vessel also using another means of propulsion, and the gaseous boundry layer propulsion means may be sealed off through the use of streamlining sea closure doors placed at the intake and outputs of the propulsion means, and thus reduce the parasitic drag associated with using the subject propulsion means and also protect the subject propulsion means interior from intrusion by marine growth and debree.

It is an object of this invention to provide an underwater discharging water jet means with a high net propulsive force and quietness of operation with potential application on submersibles, such as submarines and torpedoes.

It is an object of this invention to provide a means of better conserving thrusting jet stream force.

These and other objects and advantages shall become apparent from the following description taken in conjunction with the accompanying drawings in which:

THE DRAWINGS

FIG. 3 is a detailed cross-section of the obliquely angled jet output of FIG. 1 around which gases from either ambient air or a charged gas source (such as a bottle of compressed gas, a steam generation source, a gas source generator and/or engine exhaust) is introduced to surround the output jet stream and flow against the hull surface.

FIG. 4 is an output jet nozzle of an auxiliary drive penetrating through the boat hull and exhibiting an extended edge to aid in cavitating the jet flow and extend the jet stream originating point away from the hull surface.

FIG. 5 is a cross-section of an output jet nozzle of a bow thruster with an extended lip to aid the output flow of the jet in passing into a cavitating flow and in extending the jet stream originating point away from the hull surface.

FIG. 6 is a cross-section of a bow thruster nozzle with arrows indicating the direction of fluid flow of the jet stream as it drags water along its trail of discharge and the thrust lines are dispersed.

FIG. 7 is a cross-section of the preferred output nozzle system for submerged discharging water jet type bow thruster systems, this utilizing a gas source to develop a hull isolating surrounding gaseous fluid for the jet output thrusting stream as the subject invention.

FIGS. 18 and 18A are profile views of a water craft, showing the thruster module of FIG. 14 rotated into two of its many possible positions.

SPECIFIC DESCRIPTION OF THE INVENTION

Figures 1, 2:
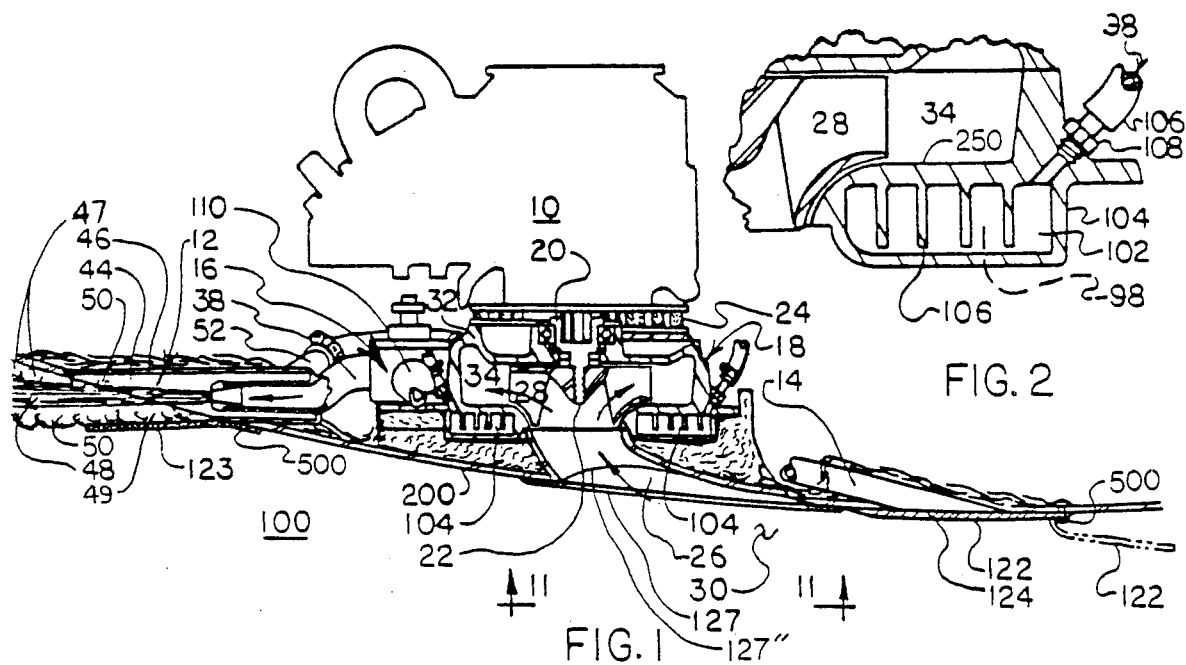
FIG. 1 is a cross-section of the propulsion unit taken on line 1—1 of FIG. 9, showing the passing of gases or gaseous layer against-the-hull and surrounding the jet stream 48.
FIG. 2 is a detailed cross-section of the motor heat exchanger and jet pump combination for the transfer of rejected heat into the pump jet stream as an embodiment.

This application represents continuing work from U.S. Pat. No. 4,611,999 issued 16 Sept. 1986. Further, U.S. Pat. No. 4,611,999 is a continuation-in-part of a related U.S. Pat. No. 4,552,537 issued 12 Nov. 1985.

The propensity of a moving fluid to follow a curved surface is well known in the art, and its effects explored in such apparatus as stream tubes, lifting bodies (wings), etc. In the marine art, a thrust generating output thrust stream is generally discharged underwater in displacement type vessels. This is done by a water moving apparatus, such as a propeller or impeller, and it may be open to the water, or confined in a specially shaped section (such as a KORT nozzle), or housed in a tunnel or tube mounted in a vessel (such as in a "tunnel" drive, tunnel thruster or axial flow pump), or mounted in a specially shaped cavity with flow straightening vanes (such as a water jet pump). The discharge of water away from the vessel in the general proximity ahead or forward of the transom will cause, depending on the fineness of the vessel stern section and the water velocity, the ejected fluid against-the-hull to follow the curvature of the hull ("Coanda Effect"). The disruption of this straight flow ejection pattern or deflection of the jet stream path from its normal course requires work, this being taken from the vessel. Examples of this in a displacement vessel is the "squatting" in the stern caused by the propellers low pressure field adjacent to the stern, as well as the "hole in the water" the stern tries to fall into resulting from the vessels forward speed. In the art, this "thrust relation" with the vessel exists roughly stated as:

For jet drive systems discharging into the atmosphere $$[2(P \times A)] \times En = \text{Thrust}$$

Where:
P=Water pressure, PSIG, measured at nozzle
A=Area of the nozzle in square inches
En=Efficiency relation or constant for nozzle and piping system
Thrust=Thrust delivered in pounds For stern mounted propeller drive systems $$(1 - Dt)[\cos \theta s (\{\phi Ap/2\}(Ve^2 - Va^2)]$$

Where:
Ap=Propeller disc area $(Pi/4)D^2$ $Ft^2$ or $M^2$ (The above values can be found in U.S. Pat. No. 4,611,999.)
B=Breadth of hull relative to shaft output centerline and mean plate line at midsection, in feet.
Dt=Taylor thrust deduction value based on block coefficient and may be calculated:

$$\text{Block Coef.} = Cb = \frac{\text{Immersed Volume}}{L \times B \times Dv}$$

Dv=Mean draft of hull relative to shaft or jet output centerline and mean plate line at midship section, in ft.
L=Length between hull perpendiculars, in ft., relative to propeller shaft or jet output centerline.
Va=Propeller water Velocity of advance in ft./sec.
Ve=Propeller water Velocity of exit in ft./sec.
$\theta s$=Propeller shaft centerline angle relative to vessel waterline.
$\phi$=Mass density constant for water (1.94 for fresh water, 1.99 for salt water for British units; for metric units, use 102 for fresh water and 104 for salt water).

It is apparent that the free propeller thrust is radically affected by the Taylor thrust deduction (Dt), which can have values in the range of approximately 15% to 40%. In submerged discharging jets, the Taylor correction factor can show a loss of up to 50% of that which may be measured with the same jet pump discharging to atmosphere. Open wheel propellers can loose up to 35% as compared to "free stream" (open flow) measurements. The invention disclosed aids in reducing these ("Eductor" and Coanda Effect) losses, as well as potentially reducing the hulls free resistance (tow rope thrust) to achieve speed.

In W. Stockman (Deutsches Patentamt Offenlegungsschift No. 2,323,029; 8 May 1973) an appendaged jet nozzling system is described which extends outside the vessel hull and the nozzle interior sheaths the jet stream with air for mixing at the air tube outlet. C. B. Cox (U.S. Pat. No. 3,288,100; filed 26 June 1964) describes an appendage jet nozzling system which extends away from the hull and gases are mixed with the water inside the nozzle system utilizing a specially designed venturi nozzle containing a turbulation blade. In P. B. Rouland (U.S. Pat. No. 3,272,333; filed 20 Sept. 1966) a special venturi nozzling system is described which is transom mounted and wherein the nozzling system is designed to mix the gases with the water within the nozzling system before the mixture leaves the discharge nozzle. W. R. Christensen (U.S. Pat. No. 3,188,997; filed 27 Nov. 1963) describes an appendage mounted water jet thrusting unit which is mounted away from the hull and which passes the jets water into a venturi system whereon it receives pressurized gas and is mixed with the water before discharging. C. M. Paxton (U.S. Pat. No. 1,662,206; filed 7 Apr. 1923) describes a flat nozzled water jet thrusting system used for modifying the vessels wake characteristics ("water excavating"). No gas jacketing or mixing is used. None of the prior art deals directly with reduction of Coanda Effect thrust losses save to mount their system on an appendage (at the expense of adding parasitic drag) well away from the hull or discharge through the transom. All the aforementioned systems have as a focus the homogenous mixing of water and air to create their propulsive fluid, and this at the expense of system energy. Also, the homogenous air/water mixture is subject to the same Coanda Effect and Taylor Wake phenomenon as unmixed water, although some benefit may be gained due to the ejected fluids easier expandability. An indicator as to the viscous drag exerted on the jet discharge of the prior art is the "Divergent Plume" see Rouland) of the fluid upon exiting the vessel. The Haynes invention subject jet discharge leaves the hull with the jet stream highly columnated and, over some distance away from the hull, the gaseous layer surrounding the jet stream breaks down in three distinctly observable stages, wherein the final stage results in jet stream gaseous layer break-down, jet stream homogenous mixing, and the development of a "divergent plume". This final stage must happen outside and away from the hull influence, and must be shielded away from the hull by the gaseous layer against-the-hull. This gaseous layer against-the-hull also serves to modify the vessels wave making properties, e.g., aid in relieving the suction caused by the afterbody of the vessel moving through the water (which none of the prior art accomplishes), and thus lowers the thrust required to propel the vessel at speed in quiet water. The subject inventions jacketing gaseous boundry layer quiets the jet discharge noise, and accoustically isolates (quiets) the sound transmission of the affected area of the hull from radiating propulsive noise (substantial reduction in noise transmission). The subject invention, in supplying a jacketing gaseous boundry layer rising against-the-hull, also provides an insulative barrier which cushions the impact of floating and suspended debris. None of the art of reference meets the objects and advantages of the subject inventive drive.

In the subject invention, the integrity, rather than the mixing of, the water jet stream is of primary importance. Further, this boundry layer must be specially tuned if its "stealth" accoustical properties (propulsive force quieting) and hull lubrication (lubrication of the sliding of large suspended and floating particals, such as ice) properties are to be explored.

The heretofore described system expressed as an auxiliary drive consists cf an engine or motor 10, a forward thrust output portion 12, a reverse thrust output portion 14, a thrust direction selector valve 16 and a jet pump 18. Engine or motor 10 is connected to jet pump 18 whereby fluid is kinetically converted therein by impeller blade lift and (depending on the pump) centrifugal force, through a coupling 20 driving into impeller shaft 22. Engine 10 is mounted on the pump 18, in the preferred embodiment, by flexible motor mounts 24. Pump 18 consists of a water intake region 26 directed into or toward the impeller 28. Impeller 28 accelerates the intake water 30 through the pump casing 32 and into the pump water discharge passageway 34. Water 30 is accelerated and a pre-rotational or rotating moment introduced in the water picked up into the impeller eye, in another embodiment (not shown) by a water prewhirling static vanes in the pump intake, and after passing through the impeller, the rotated flow is straightened by a system of stator guiding vanes 35 placed at the exiting portion of the pump. These vanes also aid in heat dissipation from the heat exchanger, as later elaborated on.

Pump forms, such as a propeller, axial flow pumps, mixed flow pumps, centrifugal pumps, as single or multiple stages, may be incorporated into the invention without departing from the spirit and intent of the invention.

The water expressed out of pump 18 through passageway 34 is directed under pressure by a connecting means 36 or passageway 36 to thrust directional control valve 16. In the forward thrust direction mode, water at high velocity is ejected out of valve 16 into thrust tube 38. Thrust tube 38 terminates in a conically tapered nozzle 40 directed away from the vessel propulsion direction. Tapered nozzle 40 has a backward radiused or sharp upper surface 42 to form a divergent annular passage to allow the gases 50 in the jacketing region 44 of tube 46 to cleanly accelerate and surround ejected expressed thrust stream 48 with a boundry layer of such gases extending externally of the hull as shown in FIG. 1. Gases 50 are directed into jacket 44 by exhaust tube 52 from engine or motor 10 to a pressure of 3 atmospheres nominal (and beyond) the ambient pressure of the water at the nozzle region (supplied from a compressed gas, engine exhaust gas or similar pressure source). Gases may be supplied from ambient air, with the energy required to establish the boundry layer being supplied by the jet stream in the nozzle region (at some thrust loss). As the jet stream 48 is discharged into the water surrounding the vessel 100, it is commonly found in the art that a suction is created against the hull. This hull bottom 200 suction due to the "Coanda Effect" is relieved by a blanketing gaseous barrier layer 47 over bottom 200. The low viscocity and easily expanded boundry layer of air and/or exhaust barrier gases 47 is directed by jacket 44. The jet stream 48 is coated by the surrounding or blanketing air and/or gas covering 49, which progressively breaks down, for at least a short distance from boat bottom 200. The hull suction is relieved by the low viscocity and easily expanded gaseous layer directed by jacket 44. Preferably (see FIG. 3), the shortest length jacketing region 44 should be behind the end of most rearward extent of surface 42 is from dead flush or no (0) nozzle inside diameter 60, to a maximum recommended length of no more than five (5) nozzle diameters 60, with one (1) to three (3) yielding good results. The jacket 44 inside diameter should have a minimum of one and one half (1.5) times the nozzle 60 cross sectional area, but should not be any greater than six (6.0) times the output nozzle 60 cross-sectional area. Generally, area ratios within 2.0 to 3.5 yield good results. The entrance tube for gas flow introduction should be no less than one (1) diameter 60 from the end plane established by nozzle 40 end, although the tube can be located closer with useable results. The ratios are "tuned" and in proper relationship when the gas barriers 47 and 49 are adequately supplied with gases, as is shown in FIGS. 1 and 7, and the vessel speed is optimized.

The pump 18 is heated by motor or engine 10, and thereby acts as an engine or motor heat exchanger. The pump 18 is heated by liquid (such as a water, alcohol, oil or other liquid material) at a temperature above the water temperature of water 100, this heated liquid being injected into a finned and labyrinthine passageway 102 in sealed chambers 104. Water 100 may also be at a temperature below the water being pumped for propulsion (the energy thus aquired being used as a thermal source for a heat pump device). Hose 106 passes the heated engine water 98 through fitting 108 into passageway 102. The heated water 98 passes under and, as application permits around and over the pump and through fins 106. The casing walls conduct heat into the surface lining the interior of the marine jet pump. The engine cooling water (or heating fluid in the case of a heat pump reservoir application) 98 leaves passageway 102 through line 110 whereon water 98 is returned via convection or coolant pump to cool engine 10 (or heat subject apparatus in the case of a heat pump application).

Figure 10:
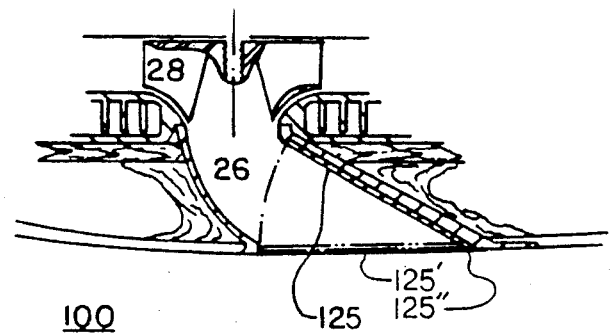
FIG. 10 is an alternative pump intake configuration employing a butterfly valve opened by pump intake pressure or other means.
Figure 11:
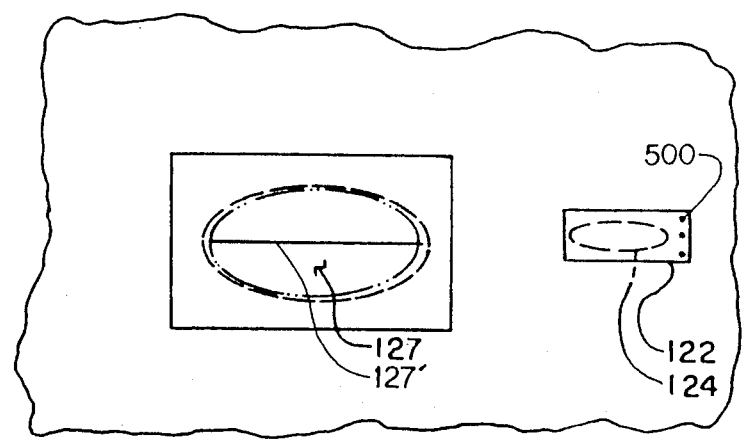
FIG. 11 is a bottom view of the pump intake of FIG. 1 incorporating a thin rubber closure and shown in the engine off (closed) position.

When valve 16 is put in the thrust reverse mode, water 30 is passed into reverse tube 120 whereon the fluid is routed ahead of the pump intake and discharged as a thrust stream 48. A thin flexible material, such as a rubber of low durometer and with a specific gravity less than 1 (allowing it to "float" closed when the jet system is not in operation), flap 122 is placed over the reverser tube to streamline reverser thrust output port 124 when not in use. A flap 123 over the forward thrust port made by tube 12 may be similarly provided for with equal streamlining and marine biostatic (or marine growth inhibiting) results. When reverse t is in use, flap 122 is blown open by the thrust stream and caused to rotate about an attachment by fastening means point 500 and reverse thrust is created. When the boat moves forward, flap 122 is caused by water flow about the hull to close flush when the jet water flow is off through this port. When forward thrust is in use, flap 123 is blown open and forward thrust is created. In FIG. 10, a flush closing intake valve 125 is provided such that when the propulsion jet is turned off and therefor no longer drawing intake water into the pump, the pump intake 26 is closed off by valve gate 125, rotating from position 125 to 125' about a fastening point or hinge point 125". This reduces the boat or vessel hull drag when under sail (sailboat case) or when steaming under propeller drive (when system is used as a thrust augmentation system), and also prohibits the intrusion of debris and marine growth into the dormant jet system. A butterfly valve is preferred, although a slitted (along a longitudinal line parallel with the direction of vessel travel) flexible thin rubber closure 127 fixed all around the edges (see FIG. 11 and FIG. 1 and the drawn outline of slit 127') to the boat bottom (and opened by pump intake suction) may be used. Other known flush closing valves, such as sliding or gate valves, may also be used. NOTE: If thrust loss is critical in the reverse direction, a nozzle similar to nozzle 12 may be incorporated in the design.

In FIG. 4 a supercavitating nozzle not utilizing a gas jacket around the thrust output stream 48 is shown. A lip 126 is extended beyond boat hull bottom 200 by about 20% to 100% of tube 38's inside diameter. The outside of the tube is preferably radiused with the hull. This allows a turn-around region for vortexing fluid flow and reduces the region subjected to supercavitating shear. A similar nozzle 130 is shown in FIG. 5 as a cross-section, in a bow thruster application. Lines of flow 235' indicate the water 100's vortexing and energy deduction action. A cavitating region 132 draws air out of solution with the water and reduces thrust deduction. However, significant energy must be lost from the jet stream and momentum transfer diffused due to stream expansion 134 (see FIG. 6) and loss of the energy needed to "pull" air out of water solution, to cavitating or boiling water 134 through a sudden pressure drop adjacent to the hull, and to drag water with the jet stream, e.g., pump the adjacent water to the jet stream along with it in vortex shear and suffer the losses associated with momentum transfer in the nozzle region and the negative pressure region created against-the-hull or adjacent to the hull 200. In FIG. 7 a bow thruster jet output nozzle utilizing the same preferred thrust output principles as in FIGS. 1 and 3 is illustrated. However, the thrust deduction factor is significantly reduced (depending on the application, less than 5% loss to a positive improvement depending on the propulsion standard compared to and hull mounting configuration) compared to FIG. 6, due to the attachment of the gaseous layer against-the-hull as shown by lines of flow arrows 235" and gas 47, wherein a conventional jet thruster thru-hull submarine discharging (such as in FIG. 6) can loose about 40%-50%. The relative proportions are the same as for the thrust output tube 12. However, a sharp edged lip 132 of a lip depth greater than 10% to 200% of output port diameter can be incorporated to further reduce hull suction in cases where the gas boost available is insufficient to supply the requisit boundry layer necessary to sustain an anti-Coanda boundry layer against-the-hull (besides increasing parasitic drag on the vessel hull, the boundry layer flow of the vessel is not characteristically modified, and the lip extension will result in a net inferiority in objective propulsive properties a subject of the invention over a flush design, e.g., thrust, modification of vessel towed resistance, noise and hull lubrication). The taper within nozzle 40 (see FIGS. 3, 7, etc.) should be 6 degrees ideally, and not have steps in going to conformity from tube 38 inside diameter to nozzle orifice diameter 60.

Figure 8:
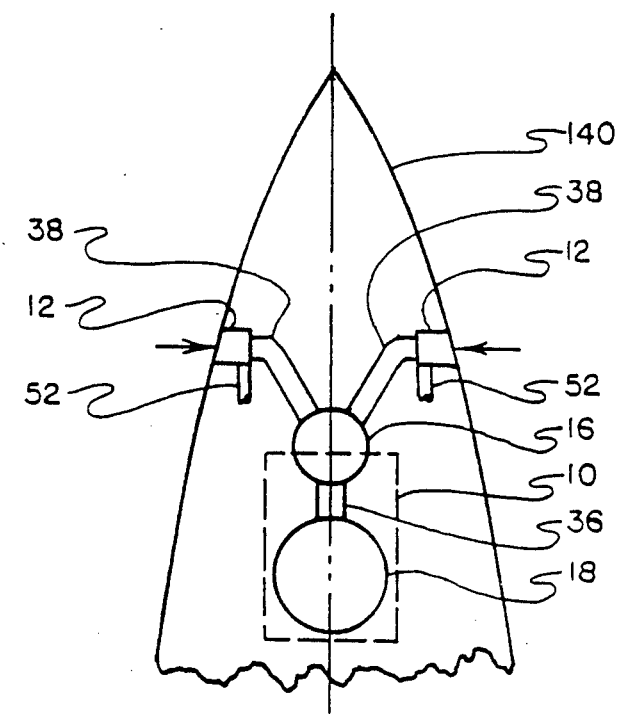
FIG. 8 is a plan view of the mechanical-hydraulic layout of the bow thruster application of the propulsive apparatus.

In FIG. 8, a preferred plan-view relationship is shown wherein the subject invention is supplying side thrust to maneuver a bow 140 of a vessel or ship (arrows show thrust direct). Valve 16 is then "Y" shaped and selects between port and starboard thrust. Air is injected at lines 52.

Figure 9:
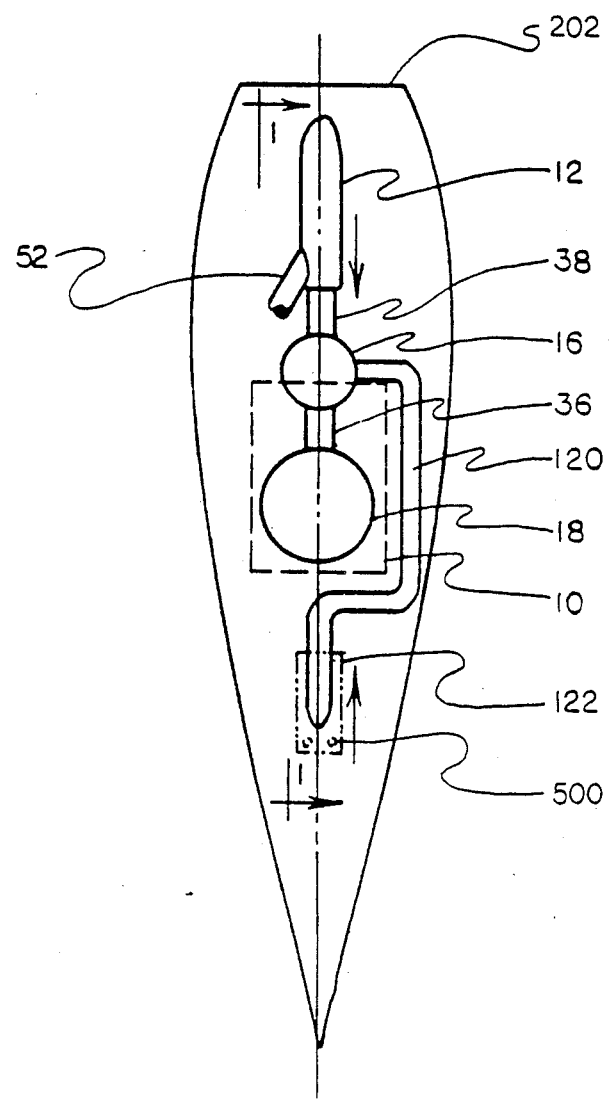
FIG. 9 is a plan view of the mechanical-hydraulic layout of the jet auxiliary drive for marine use.

FIG. 9 shows a preferred plan-view relationship for the invention used as a marine auxiliary. Steerage as a marine auxiliary is provided by a steering rudder located aft of the jet output, preferably greater than 30 inches. In neutral, the thrust valve 16 directs water flow equally out both thrust ports, and proportionately divides thrust as it is moved from 100% forward (or port in the case of a bow thruster) to 100% aft (or starboard in the thruster case).

Figure 12:
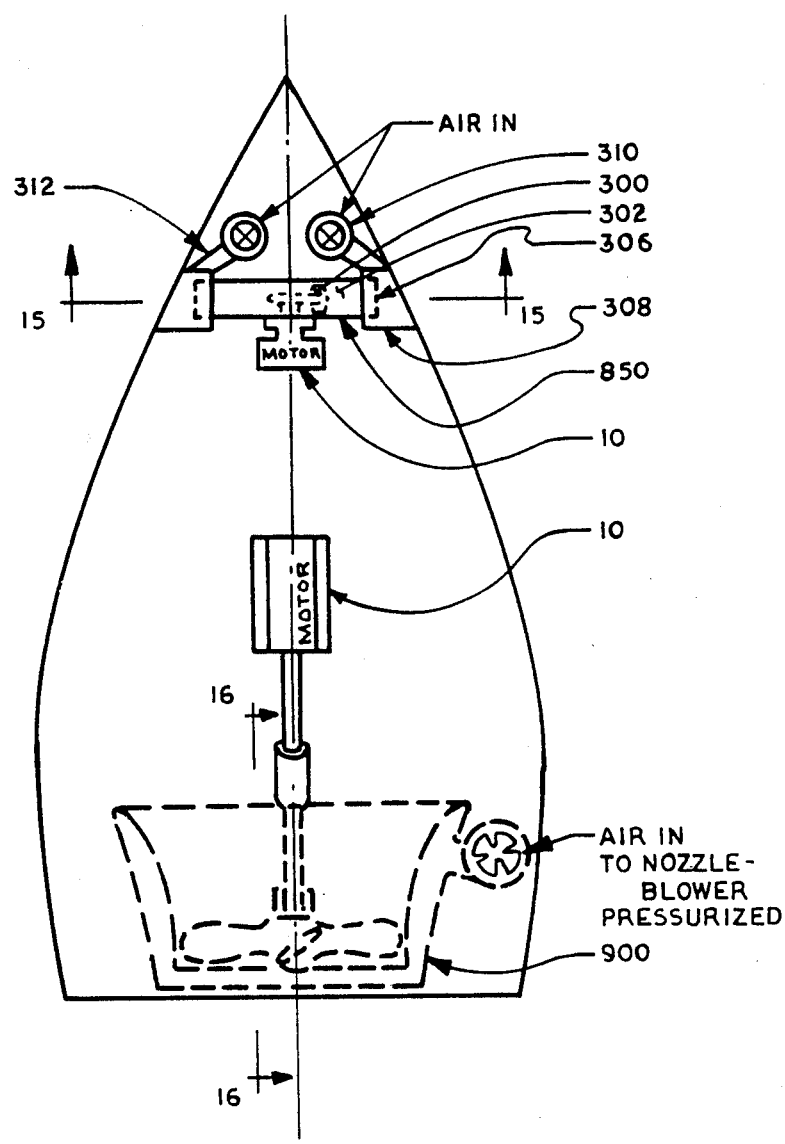
FIG. 12 is a sectional plan view of a vessel with a tube mounted propeller thruster used in a bow thruster application and a housed or nozzled propeller as a driving means.

In FIG. 12 is shown a plan view in partial cross-section of a vessel. A propeller means 300 is shown rotating in a conduit or alley 302 and filled with the water to be used as a propulsive fluid. This water is driven by the propeller through a nozzling exit point 306 into a boundry layer generating region 308 wherein an air layer is defined about about the outputted jet stream to define a boundry layer about this ejected jet stream which acts to provide a layer of transitional shear as the water leaves the vessel. This air layer can be provided by a charging blower or compressor 310 especially applicable in a propeller system because of the large volume of air required and the relatively low ejected stream velocity) through a duct 312. These numbers are also used in FIGS. 13, 14, 15 and 16 to explain the inventions applications and components. The invention supplies a necessary layer of gaseous fluid against-the-hull, which works to lower Coanda Effect propulsion losses and reduces the vessels water friction and wave making power losses. This blanketing of the ejected thrust stream also provides a region of high transitional shear between the propulsive fluid and the outside water, and increases the amount of time in which the ejected fluid may dissipate its energy. This reduces the shear shock of the ejected jet stream, and significantly reduces propulsion noise. Also, the region blanketed by the against-the-hull gaseous boundry layer is effectively altered in its noise transmisibility characteristics, further changing the noise characteristics of the vessel.

Figure 13:
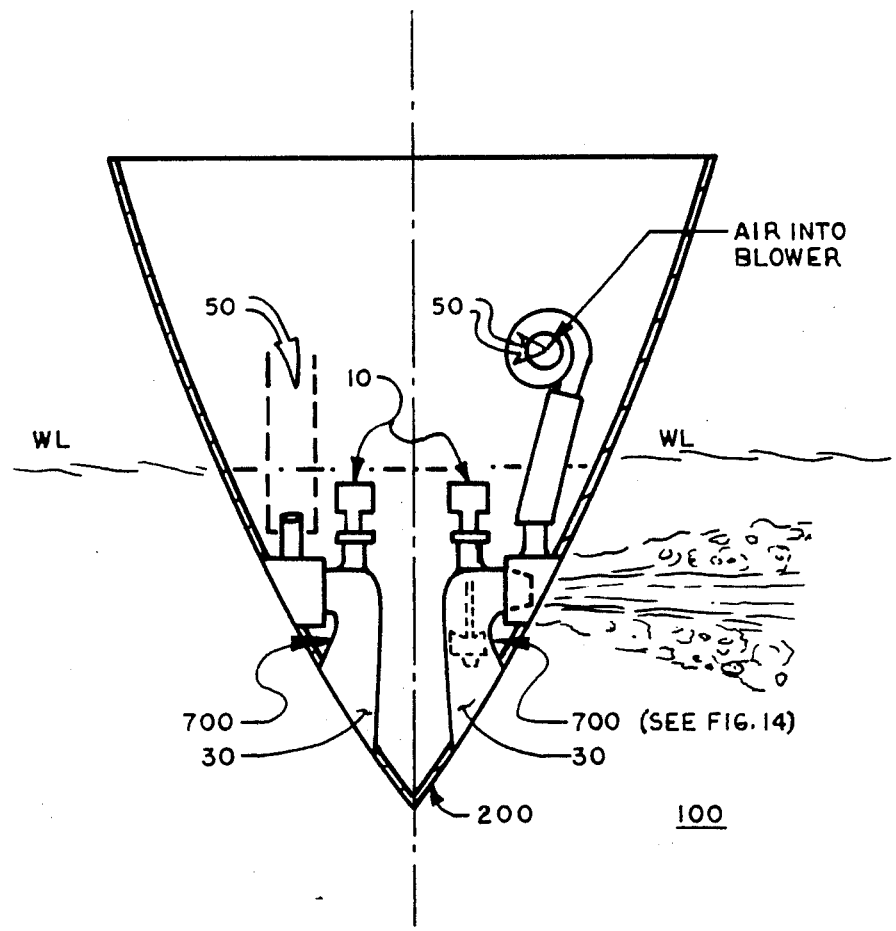
FIG. 13 is a bow view of a vessel with an axial flow thruster module as used to thrust in a single direction outlined.
Figure 14:
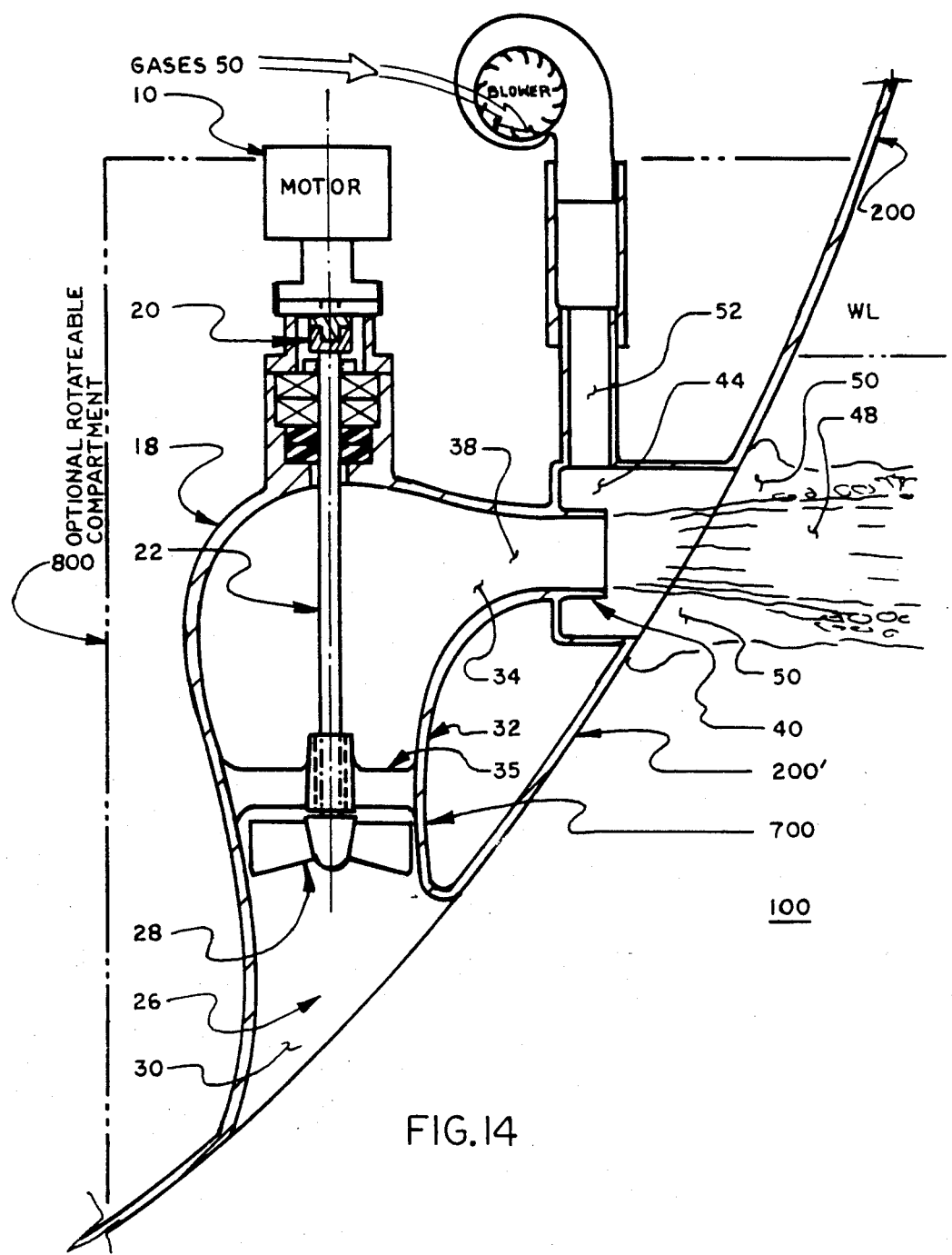
FIG. 14 is a partial cross-section of FIG. 13 taken on line 14 showing the thruster module construction details.

In FIGS. 13 and 14, a single thruster pump 700 is shown as a "module", a single thruster installed to apply thrust in a specific direction. This thruster module 700 may be installed in a rotatable compartment 800, or located on a rotatable hull plate 200' (see FIG. 14 and 18) on the vessel bottom wherein this hull plate 200' is rotated by a motor means, wherein such thruster module may provide thrust selectably through 360 degrees of selection (an "azimuth" thruster). This would allow the jet discharge, through use of the gases 50 (Corona-Jet principle), to be expressed away from the vessel or ships bottom with significantly reduced Coanda Effect and eductor losses. Such an azimuth thruster would usually be located to intake 26 and discharge 44 through the vessels bottom plates 200 and 200' and thereby would be discharging its gas jacketed water jet stream along the vessel bottom and the curved upward chines and vessel sides. Configurations of this type of thruster would include one wherein the intake 26 and discharge 44 through the vessels bottom plates 200 and 200' and thereby would be discharging stationary and a directable flush nozzle would discharge the jet stream (thrust would be poorest when the pump would ingest its own output), and one type wherein the jet intake and output would rotate as a module 800 (giving maximum thrust at all points of jet discharge). Such a module approach is shown in FIG. 18 at two points (aft, and then toward port) of its possible 360 degree orientation.

Figure 15:
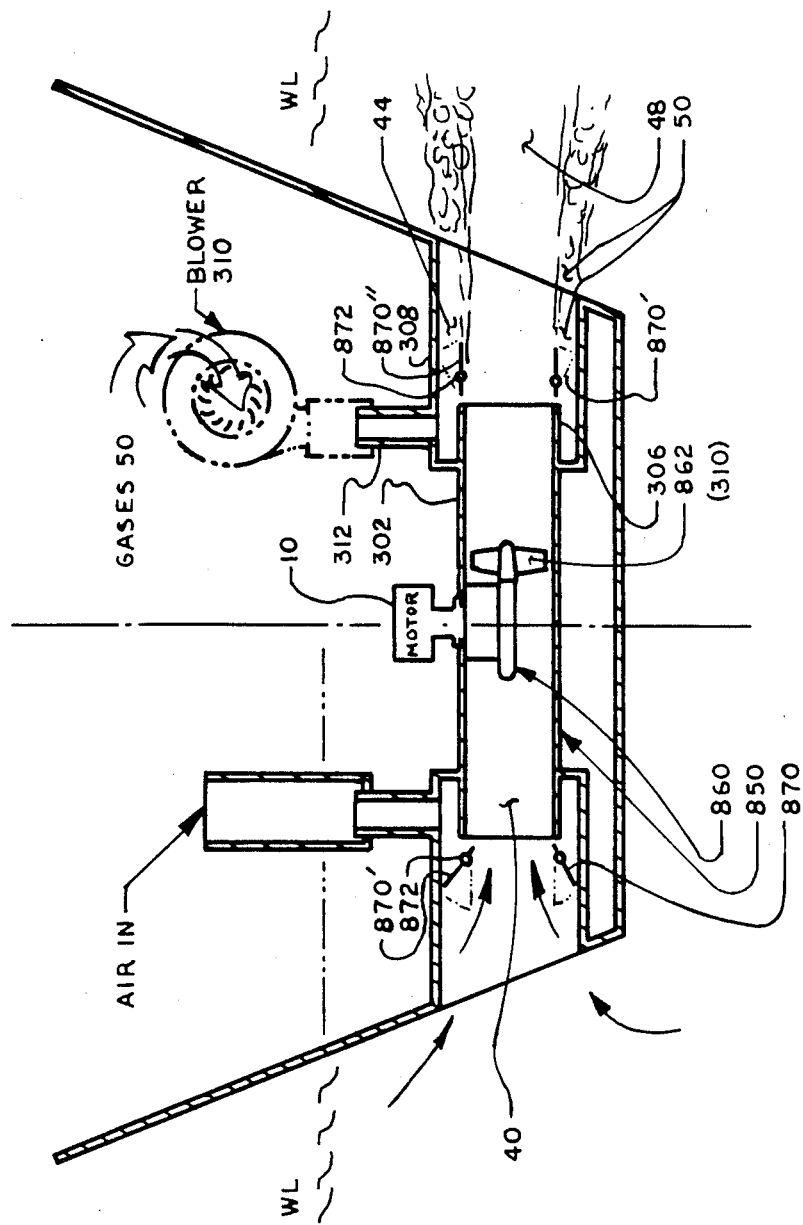
FIG. 15 is a cross-sectional view of a tube mounted propeller thruster taken along line 15—15 of FIG. 12 showing incorporation of the invention.

In FIG. 15 is shown a housed propeller 850 type ("tunnel") bow thruster 850 with gear housing 860 and propeller 862. The water flow may enter or exit through a cylinder 850 or "tunnel" 850. Water flow entering and exiting the thruster is directed by a variable flow directing means or flow plates 870 for allowing directed and variable streamlined and nozzled flow pivot about a pivot point 872. Plates 870 may be moved between positions 870' (intake, wherein the water is smoothly guided from the jacket region 44 to the tube outlet/inlet portion or nozzle portion 40) and 870'' (output, wherein the plates open and define a water expressing nozzle and the region where gases 50 will be defined around the water thrust stream) in response to water flow forces by the balance position of the pivot 872.

Figure 16:
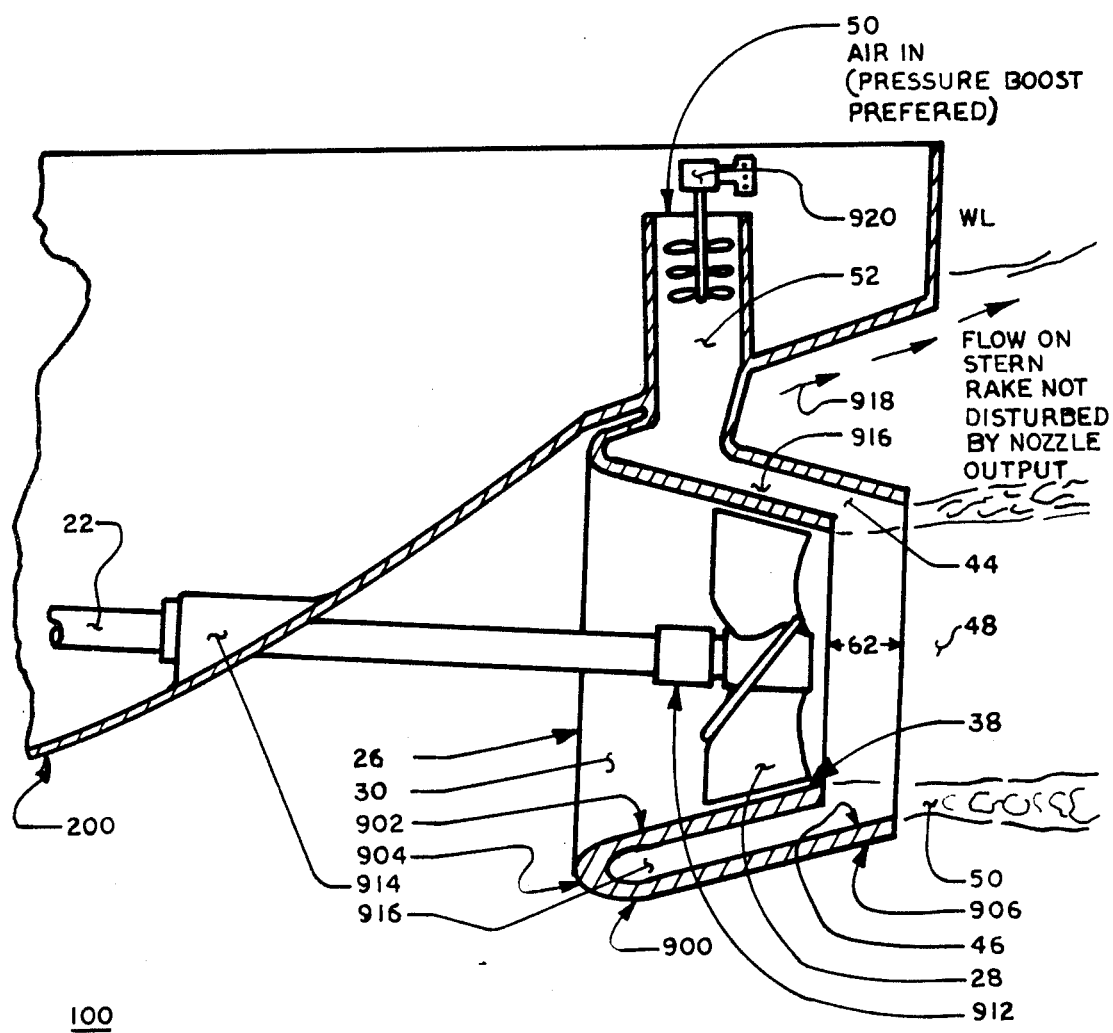
FIG. 16 is a cross-section taken on line 16—16 of FIG. 12 showing a housed or nozzled propeller incorporating the invention.

In FIG. 16 (taken on line 16—16 of FIG. 12) is shown an alternative housed propeller. This housing is an external nozzle 900 (such as a Kort nozzle) consisting of an inside portion 902 (usually tapered), a rounded leading edge 904 and a backwardly tapered plate 906. Portion 902, edge 904 and plate 906 may be formed together, and will define a cavity 916 wherein gases (air) 50 may be delivered by a tube 52 under pressure by a blower pump 920. Tubular shaped gases 50 surrounding the jet stream 48 in sufficient volume at pressure quiets the underwater propeller accoustical signature (when the propeller is under protection) and reduces the propensity of the outputted jet flow from educting or dragging water along with it by supplying a gaseous tube surrounding the outputted jet stream 48 flow.

Figure 17:
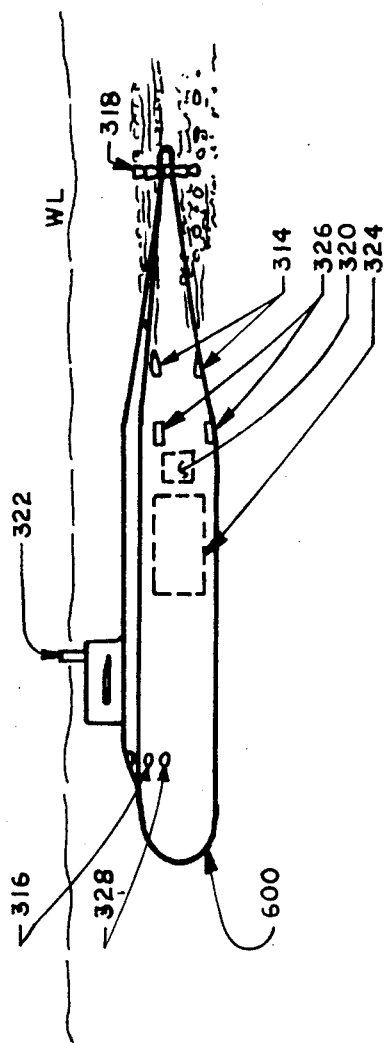
FIG. 17 is a plan view of a submersible water craft, such as a submarine, showing the position of the contained gas source, the location of the invention water jet drives for auxiliary propulsion, and the propeller main drive (a controlable pitch drive which is fully featherable during jet operation).
Figure 19:
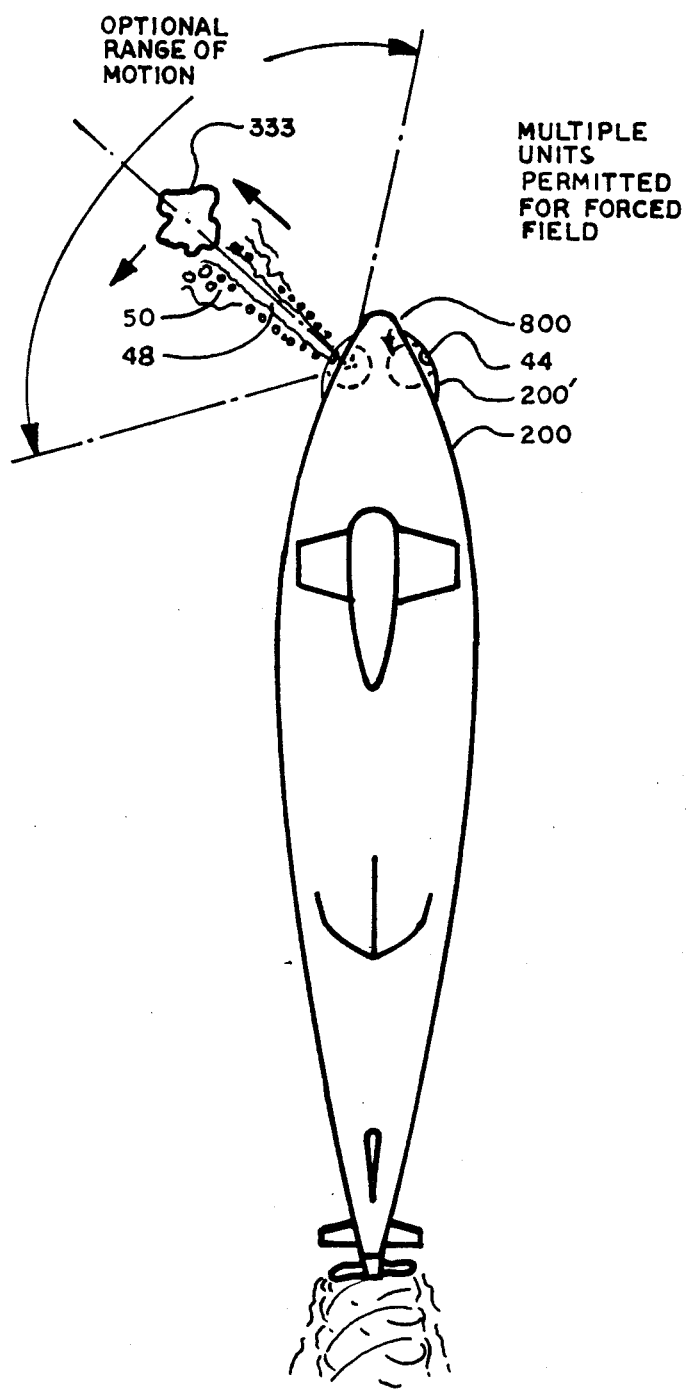
FIG. 19 is a plan view of a surface water craft, such as a surfaced submarine or destroyer, operating the thruster in a countermeasures operation. Water jet nozzles are discharging gaseous jacketed thrust streams through optionally rotateable hull plates (see also FIG. 14) for driving off surface ice and debree.

In FIG. 17 is shown a submersible, such as a torpedo or submarine, wherein the invention may be mounted. Corona-Jet output nozzles 314 may be mounted in the aft portion of the submersible 600, as well as in the bow as bow jets 316. The submersible may be usually powered by a propeller (preferably a featherable controllable pitch system) 318, wherein the propeller 318 may be stopped during jet nozzle 314's operation. The power for jet nozzle water flow for nozzles of jets 314 and 316, as well as power for propeller 318, may be supplied by means known in the art from motive or motor power source 320. Gases for the water jet Corona-Jet nozzles may be supplied during surface running operations by a valved snorkel tube 322 or during submerged operation by a contained gas source 324, such as nuclear reactor steam and reacted chemicals. The main water jets are supplied with water through jet intakes 326 and the bow thruster is supplied through a jet intake 328.

In environments where low noise levels are required, and/or in arctic ice conditions where the propeller may be damaged when operated around ice flows, the propeller 318 may be fully feathered and its blades aligned so they may act as rudders. Optionally, the propeller blades may be retracted into the propeller hub or they may be folded back in a fashion similar to folding propellers found in the art used on sailboats. The jets 314 may then be used for propulsion. If suitably placed, the bow thruster may be activated out both ports and used to drive off floating ice 333, and will provide a boundry layer of gaseous fluid against-the-hull at the waters surface as well as provide an outwardly directed current of water.

While a specific embodiment of an improved marine propulsion motor and propulsion system associated therewith have been disclosed in the foregoing description, it will be understood that various modifications within the spirit of the invention may occur to those skilled in the art. Therefor, it is intended that no limitations be placed on the invention except as defined by the scope of the appended claims.

What is claimed is:

1. In combination with a marine craft including a hull having a submerged surface portion within which a discharge opening is formed and thrust jet propelling means for discharging a jet flow stream of water from the discharge opening along a discharge path, including a nozzle from which the jet flow stream emerges, a jacket having a predetermined passage diameter and length in enclosing relation to the jet flow stream, a source of gas, and means for introducing gas into the jacket to form a gaseous boundry layer in surrounding relation to the jet flow stream, the improvement residing in reducing thrust deduction losses of the jet propelling means ordinarily resulting from deflection of the discharge path of the jet flow stream externally toward the surface portion of the hull, comprising means for pressurizing the gas to a predetermined pressure within the jacket, and means mounting the nozzle in operative relation to the jacket and the discharge opening for the formation of the gaseous boundry layer against the hull and extending the gaseous layer therefrom under said predetermined pressure externally of the hull for expansion relative to the jet flow stream under suction pressures developed externally on the surface portion of the hull adjacent thereto, the improvement residing in such gaseous layer being sufficiently pressurized to produce an isolated jet flow field surrounded by a tubular shaped cavity which accoustically reduces propulsion system noise emanating from the jet stream and affected portions of the hull.

2. The combination with a marine craft including a hull having a submerged surface portion within which a discharge opening is formed and thrust jet propelling means for discharging a jet flow stream of water from the discharge opening along a discharge path, including a nozzle from which the jet flow stream emerges, a jacket having a predetermined passage diameter and length in enclosing relation to the jet flow stream, a source of gas, and means for introducing gas into the jacket to form a gaseous boundry layer in surrounding relation to the jet flow stream, the improvement residing in reducing thrust deduction losses of the jet propelling means ordinarily resulting from deflection of the discharge path of the jet flow stream externally toward the surface portion of the hull, comprising means for pressurizing the gas to a predetermined pressure within the jacket, and means mounting the nozzle in operative relation to the jacket and the discharge opening for the formation of the gaseous boundry layer against the hull and extending the gaseous layer therefrom under said predetermined pressure externally of the hull for expansion relative to the jet flow stream under suction pressures developed externally on the surface portion of the hull adjacent thereto, the improvement residing in said jet propelling means being a housed propeller truster wherein the water flow may enter or exit through a cylinder open to both sides of the vessel.

3. A unit of claim 2 wherein the water jet flow output is surrounded by a region of gases as determined by variable flow directing means.

4. A unit as in claim 2, in which the entering and exiting water flow into the propeller region is directed by a flow directing means.

5. A unit as in claim 4, in which the flow directing means is by pivoting plates placed at the periphery or edge of the tube exit point and the gas jacket region.

6. A unit as in claim 4, in which the flow directing means is responsive to the direction of the fluid flow for automatic change between water input and output positions.

7. In combination with a marine craft including a hull having submerged surface portion within which a discharge opening is formed and thrust jet propelling means for discharging a jet flow stream of water from the discharge opening along a discharge path, including a nozzle from which the jet flow stream emerges, a jacket having a predetermined passage diameter and length in enclosing relation to the jet flow stream, a source of gas, and means for introducing gas into the jacket to form a gaseous boundry layer in surrounding relation to the jet flow stream, the improvement residing in reducing thrust deduction losses of the jet propelling means ordinarily resulting from deflection of the discharge path of the jet flow stream externally toward the surface portion of the hull, comprising means for pressurizing the gas to a predetermined pressure within the jacket, and means mounting the nozzle in operative relation to the jacket and the discharge opening for the formation of the gaseous boundry layer against the hull and extending the gaseous layer therefrom under said predetermined pressure externally of the hull for expansion relative to the jet flow stream under suction pressures developed externally on the surface portion of the hull adjacent thereto, the improvement residing in said pump being located stationary with respect to said hull, and said nozzle means being rotatable with respect to said pump and said hull.

8. In combination with a marine craft including a hull having a submerged surface portion within which a discharge opening is formed and thrust jet propelling means for discharging a jet flow stream of water from the discharge opening along a discharge path, including a nozzle from which the jet flow stream emerges, a jacket having a predetermined passage diameter and length in enclosing relation to the jet flow stream, a source of gas, a means for introducing gas into the jacket to form a gaseous boundry layer is surrounding relation to the jet flow stream, the improvement residing in reducing thrust deduction losses of the jet propelling means ordinarily resulting from deflection of the discharge path of the jet flow stream externally toward the surface portion of the hull, comprising means for pressurizing the gas to a predetermined pressure within the jacket, and means mounting the nozzle in operative relation to the jacket and the discharge opening for the formation of the gaseous boundry layer against the hull and extending the gaseous layer therefrom under said predetermined pressure externally of the hull for expansion relative to the jet flow stream under suction pressures developed externally on the surface portion of the hull adjacent thereto, the improvement residing in said pump means and said jacketed nozzle means being located on a rotateable hull portion or plate, said portion or plate being able to be rotated up to 360 degrees for the application to the vessel directed thrust.

9. In combination with a marine craft including a hull having a submerged surface portion within which a discharge opening is formed and thrust jet propelling means for discharging a jet flow stream of water from the discharge opening along a discharge path, including a nozzle from which the jet flow stream emerges, a jacket having a predetermined passage diameter and length in enclosing relation to the jet flow stream, a source of gas, and means for introducing gas into the jacket to form a gaseous boundry layer in surrounding relation to the jet flow stream, the improvement residing in reducing thrust deduction losses of the jet propelling means ordinarily resulting from deflection of the discharge path of the jet flow stream externally toward the surface portion of the hull, comprising means for pressurizing the gas to a predetermined pressure within the jacket, and means mounting the nozzle in operative relation to the jacket and the discharge opening for the formation of the gaseous boundry layer against the hull and extending the gaseous layer therefrom under said predetermined pressure externally of the hull for expansion relative to the jet flow stream under suction pressures developed externally on the surface portion of the hull adjacent thereto, the improvement residing in:

(a) locating said jacketed nozzles in said vessel in a propulsive relation (b) directing said thrust stream in an isolating flow stream useful in forcing floating debree, such as ice, away from the hull, as well as cushioning its impact and lowering its friction on the hull surface.

10. A unit as in any one of claims 1, 2 or 7–9 inclusive, in which the unit is in combination with a submersible, such as a submarine or torpedo.

11. A unit as in any one of claims 1, 2 or 7–9 inclusive, in which the gas supplied to the gaseous boundry layer is by means of a snorkel.

12. A unit as in any one of claims 1, 2 or 7–9 inclusive, in which the gaseous boundry layer jet drive is used as an augmentation drive (e.g., in addition to another driving source, such as a propeller drive).

* * * * *